US008322878B2

(12) United States Patent
Hsia et al.

(10) Patent No.: US 8,322,878 B2

(45) Date of Patent: Dec. 4, 2012

(54) LINEAR SOLID-STATE LIGHTING WITH A DOUBLE SAFETY MECHANISM FREE OF SHOCK HAZARD

(75) Inventors: Chungho Hsia, San Jose, CA (US); Pai-Sheng Shen, Bellevue, WA (US); Ching-Feng Lin, Taipei (TW)

(73) Assignee: Lightel Technologies Inc., Reton, WA (US)

( * ) Notice: Subject to any disclaimer, the term of this patent is extended or adjusted under 35 U.S.C. 154(b) by 352 days.

(21) Appl. No.: 12/871,905

(22) Filed: Aug. 30, 2010

(65) Prior Publication Data

US 2011/0149564 A1 Jun. 23, 2011

Related U.S. Application Data

(63) Continuation-in-part of application No. 12/645,390, filed on Dec. 22, 2009, now Pat. No. 8,147,091.

(51) Int. Cl.
*F21S 4/00* (2006.01)
*H02H 11/00* (2006.01)

(52) U.S. Cl. ........ 362/221; 362/218; 362/225; 362/394; 362/249.02; 362/390

(58) Field of Classification Search ............ 362/217.01, 362/218, 221, 225, 249.02, 390, 394
See application file for complete search history.

(56) References Cited

U.S. PATENT DOCUMENTS

| | | | | |
|---|---|---|---|---|
| 5,844,759 | A * | 12/1998 | Hirsh et al. | 361/42 |
| 7,476,004 | B2 * | 1/2009 | Chan | 362/240 |
| 7,976,185 | B2 * | 7/2011 | Uang et al. | 362/240 |
| 2010/0033095 | A1 * | 2/2010 | Sadwick | 315/51 |
| 2011/0149564 | A1 * | 6/2011 | Hsia et al. | 362/221 |

* cited by examiner

*Primary Examiner* — Anne Hines
(74) *Attorney, Agent, or Firm* — Pai Patent & Trademark Law Firm; Chao-Chang David Pai

(57) ABSTRACT

A linear light-emitting diode (LED)-based solid-state lamp having a double safety mechanism that comprises at least three shock protection switches, fully protects a person from possible electric shock during re-lamping or maintenance. One protection switch provided at each end of the lamp is able to cut off power when the associated end of the lamp is not inserted into the lamp socket. A third protection switch can be used to turn off the power from the AC main for additional shock protection.

16 Claims, 5 Drawing Sheets

LINEAR SOLID-STATE LIGHTING WITH A DOUBLE SAFETY MECHANISM FREE OF SHOCK HAZARD

CROSS-REFERENCE TO RELATED APPLICATIONS

This application is a continuation-in-part of U.S. patent application Ser. No. 12/645,390, filed Dec. 22, 2009, now pending. The prior application is incorporated herein by reference in its entirety.

BACKGROUND OF THE INVENTION

1. Field of the Invention

This invention relates to linear light-emitting diode (LED) lamps and more particularly to a shock hazard-free linear LED lamp with a double safety mechanism.

2. Description of the Related Art

Solid-state lighting from semiconductor light-emitting diodes (LEDs) has received much attention in general lighting applications today. Because of its potential for more energy savings, better environmental protection (no hazardous materials used), higher efficiency, smaller size, and much longer lifetime than conventional incandescent bulbs and fluorescent tubes, the LED-based solid-state lighting will be a mainstream for general lighting in the near future. As LED technologies develop with the drive for energy efficiency and clean technologies worldwide, more families and organizations will adopt LED lighting for their illumination applications. In this trend, the potential safety concerns such as risk of electric shock become especially important and need to be well addressed.

In retrofit application of a linear LED (LL) lamp to replace an existing fluorescent tube, one must remove the starter or ballast because the LL lamp does not need a high voltage to ionize the gases inside the gas-filled fluorescent tube before sustaining continuous lighting. LL lamps operating at AC mains, such as 110, 220, or 277 VAC, have one construction issue related to product safety and needed to be resolved prior to wide field deployment. This kind of LL lamps always fails a safety test, which measures through lamp leakage current. Because the line and the neutral of the AC main apply to both opposite ends of the tube when connected, the measurement of current leakage from one end to the other consistently results in a substantial current flow, which may present risk of shock during re-lamping.

LEDs have a long operating life of 50,000 hours, much longer than conventional lighting devices do. One of the most important factors that detrimentally affect operating life of an LED-based lamp is high junction temperature of LEDs. While LEDs can operate 50,000 hours, the LED lamps do need a good thermal management in their heat sink design. A more efficient heat sink can effectively maintain LED junction temperature at a lower value and thus prolong the operating life of LEDs. Currently, the most cost-effective heat sink is made of metal. One of the drawbacks of using a metal as a heat sink in LL lamp application is electrical conductivity because shock hazard may occur when consumers touch the heat sink that is not well insulated from the LED printed circuit board (PCB) and the internal driver that powers the LEDs.

Today, such LL lamps are mostly used in a ceiling light fixture with a power switch on the wall. The ceiling light fixture could be an existing one used with fluorescent tubes but retrofitted for LL lamps or a specific LL lamp fixture. The drivers that provide a proper voltage and current to LEDs could be internal or external ones. Not like LL lamps with an external driver that is inherently electric-shock free if the driver meets the dielectric withstand standard used in the industry, LL lamps with an internal driver and a metallic heat sink present another shock hazard during relamping or maintenance, when a substantial leakage current flows from any one of AC voltage input through the metallic heat sink to the earth ground. Despite this disadvantage, LL lamps with an internal driver and a metallic heat sink still receive wide acceptance because they provide a long life, a stand-alone functionality, and an easy retrofit for an LL lamp fixture.

Any LL lamps will produce a small amount of leakage current through an internal electrical contact and the metallic heat sink because of the voltages applied and internal capacitance present in the LL lamp. When design flaws or material and workmanship defects appear, the electrical insulation in the LL lamp can break down, resulting in substantial leakage current flow. It mostly happens for small gaps between current-carrying conductors and the earth ground. When an LL lamp is operated under normal conditions, environmental factors such as dirt, contaminants, humidity, vibration, and mechanical shock can weaken the insulation and facilitate the current to flow through these small gaps and create a shock hazard to anyone who comes into contact with the metallic heat sink on the faulty LL lamps if care is not well taken.

As consumerism develops, consumer product safety becomes extremely important. Any products with electric shock hazards and risk of injuries or deaths are absolutely not acceptable for consumers. However, commercially available LL lamps with internal drivers and a metallic sink, which are used to replace fluorescent tubes, fail to provide a solution to these problems. In the present invention, a utility shock protection switch in addition to two end switches used on the lamp bases is adopted to fully protect consumers from possible electric shock injuries and deaths during relamping or maintenance.

Referring to FIG. 1 and FIG. 2, a conventional LL lamp 100 without shock protection switch comprises a metallic housing 110 with a length much greater than its radius, two end caps 120 and 130 each with a bi-pin 180 and 190 (not shown) on two opposite ends of the metallic housing 110, LED arrays 140 on an LED PCB 150, and an LED driver 160 used to generate a proper DC voltage from the energy supply of the AC main through internal wire connections 151 and 152 and provide a proper current to supply the LED arrays 140 through an internal wire connection 161 and 162 such that the LED's 170 on the PCB 150 can emit light. The PCB 150 is glued on a surface of metallic housing 110 by an adhesive with its normal parallel to the illumination direction. The bi-pins 180 and 190 on the two end caps 120 and 130 connect electrically to an AC main, either 110 V, 220 V, or 277 VAC through two electrical lamp sockets (not shown) located lengthways in an existing fluorescent tube fixture (not shown). The two lamp sockets in the fixture connect electrically to the line (L) and the neutral (N) wire of the AC main, respectively.

To replace a fluorescent tube with an LL lamp 100, one inserts the bi-pin 180 at one end of the LL lamp 100 into one of the two lamp sockets in the fixture and then inserts the bi-pin 190 at the other end of the LL lamp 100 into the other lamp socket in the fixture. When the line of the AC main applies to the bi-pin 180 through a lamp socket, there exists a shock hazard as long as the bi-pin 190 at the other end is not in the lamp socket because consumers who replace the linear LED lamp may touch the exposed bi-pin 190. The excessive current will flow from the bi-pin 180, an internal wire 151, driver 160, and an internal wire 152, and the bi-pin 190 to earth through his or her body—a shock hazard. This is most likely to happen in practice. To prevent consumers from injury for this shock hazard, Underwriters Laboratories (UL), uses its standard, UL 935, Risk of Shock During Relamping (Through Lamp), to do the current leakage test and to determine if LL lamps under test meet the consumer safety requirement.

On the other hand, when the line or neutral wire of the AC main connects to the bi-pin 180 through a lamp socket, no matter whether the bi-pin 190 at the other end is in the lamp socket or not, there exists another shock hazard because at this time, if a high voltage from a lighting strike, for example, applies to the AC main of the linear LED lamp, which happens to be a faulty one mentioned above, a high voltage breakdown, from the insulation-weakest point along an electrical path from the bi-pin 180, through internal wires 151, 161, and 162, the LED driver 160, and LED arrays 140 on the LED PCB, to the heat sink 110, will lead to an excessive leakage current flow to the heat sink 110. If the person who replaces the LL lamp 100 touches the heat sink 110, which also serves as the housing of the LL lamp, he or she will get electric shock because the current flows to earth through his or her body. This is likely to happen in practice. To prevent consumers from injury for this shock hazard, Underwriters Laboratories (UL), uses one of the procedures in UL 1993 Standards, Dielectric Voltage-Withstand Test, to determine if LL lamps under test meet the consumer safety requirements.

SUMMARY OF THE INVENTION

The present invention uses a double safety mechanism in an LL lamp to fully protect the person from possible electric shock during re-lamping or maintenance.

A linear light-emitting diode (LED)-based solid-state lamp comprising a heat sink, an LED driver, an LED printed circuit board (PCB) with a plurality of LEDs, a lens, and the double safety mechanism, is used to replace a fluorescent tube in an existing lamp fixture. The double safety mechanism comprises three shock protection switches: one each at two ends of the LL lamp and one preferably on the lateral side of the lamp. The shock protection switches at the two ends ("end shock protection switch" hereafter) are used to automatically shut off the internal electrical connections in the lamp when either one of bi-pins at the ends is out of the lamp socket. The third shock protection switch ("utility shock protection switch" hereafter) preferably on the side of the lamp is used to switch the connections on or off between both the line and neutral of the AC main and the two inputs of the LED driver at the same time. In such a scheme, no line voltage or accidental voltage spikes will possibly appear between the activated and the exposed bi-pins and between any of the bi-pins and the metallic heat sink during re-lamping or maintenance. Thus, any leakage current that may cause shock hazard is completely eliminated.

DETAILED DESCRIPTION OF THE INVENTION

When an LL lamp is used as a lighting source, consumers used to use a power switch on the wall to turn the LL lamp power on or off. Intuitively, they just turn the LL lamp power off during relamping and maintenance and presume that it is safe, without any shock hazards. But somehow, if the wiring is such that the neutral wire goes to the switch while the hot wire is connected all the time to the LL lamp fixture, then there exists shock hazards during relamping and maintenance because the consumers may touch the exposed bi-pin when the other bi-pin is still in the electric lamp socket. One of the solutions is to use two end shock protection switches, one each on the two ends, such that the leakage current is blocked when either one of bi-pins is out of the lamp socket.

Figure 1:
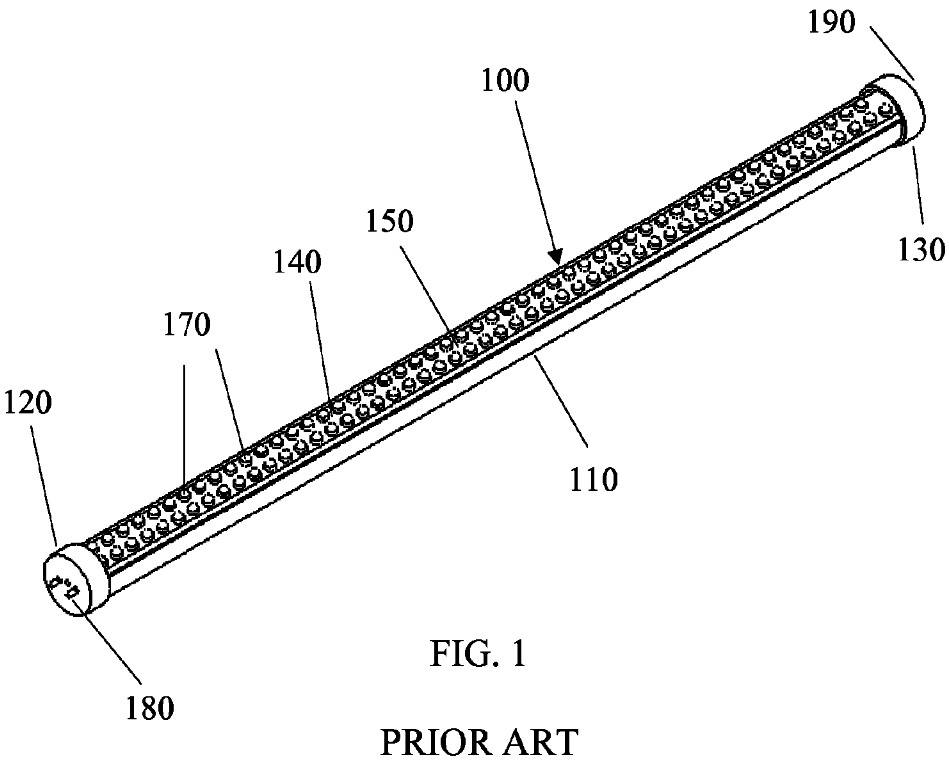
FIG. 1 PRIOR ART
FIG. 1 is an illustration of a conventional LL lamp without shock protection switch.
Figure 2:
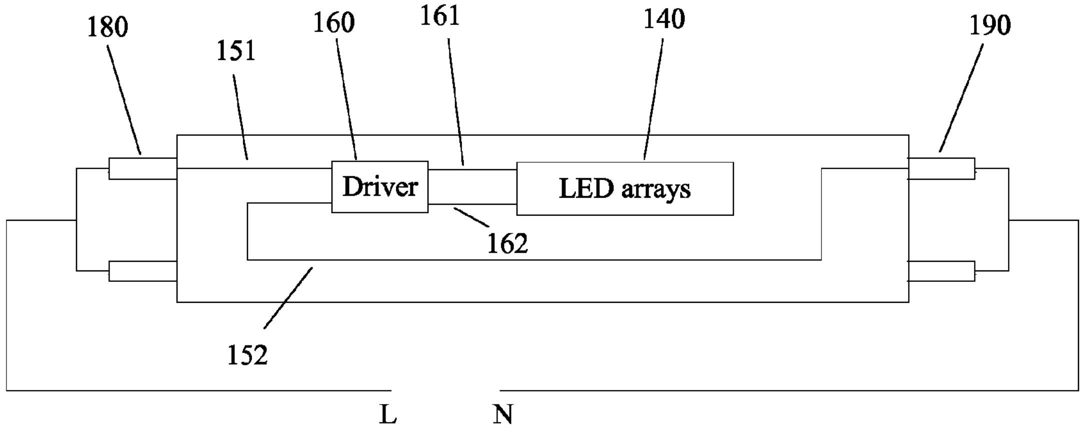
FIG. 2 PRIOR ART
FIG. 2 is a functional block diagram of a conventional LL lamp.
Figure 3:
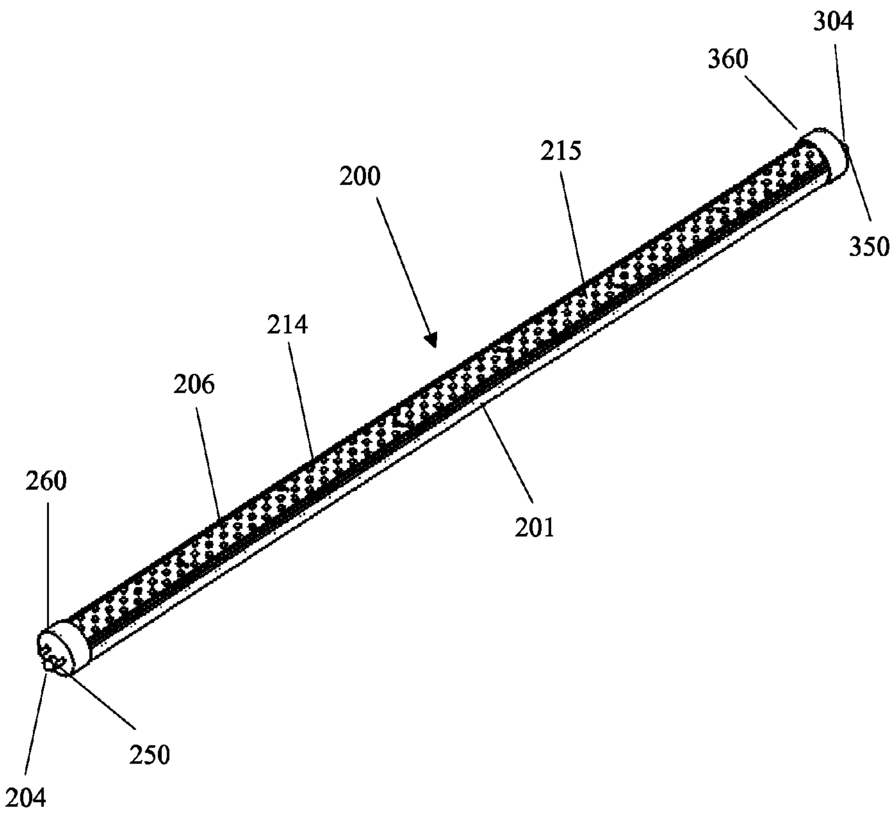
FIG. 3 is an illustration of an LL lamp with two end shock protection switches at both ends according to the present invention.

FIG. 3 is an illustration of an LL lamp with two end shock protection switches at both ends according to the present invention. The LL lamp 200 has a housing 201, two lamp bases 260 and 360, one at each end of the housing 201, two bi-pins 250 and 350 (not shown), two actuation mechanisms 204 and 304 (not shown) for end shock protection switches, one each on the two lamp bases 260 and 360, and an LED array 214 on an LED PCB 215 with a plurality of LEDs 206. The housing 201, preferably metallic, serves also as a heat sink with a toothed profile to increase the heat dispersion (not shown for clarity). Other types of projections can be formed on the outer surface of the housing for improved heat dispersion.

Figure 4:
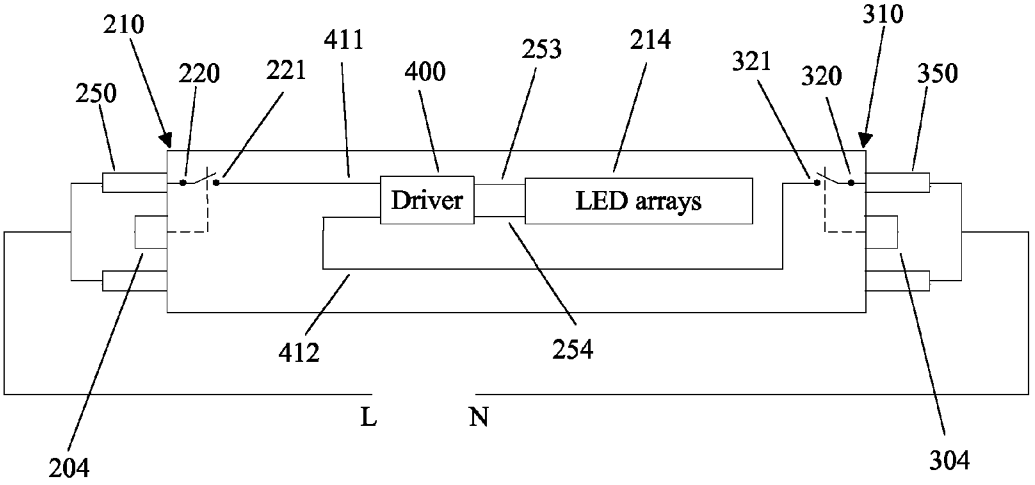
FIG. 4 is a functional block diagram of an LL lamp with two end shock protection switches at both ends of the LL lamp according to the present invention.

FIG. 4 is a functional block diagram of an LL lamp with two end shock protection switches at both ends of an LL lamp according to the present invention. The end shock protection switch 210 comprises two electrical contacts 220 and 221 and one actuation mechanism 204. Similarly, an end shock protection switch 310 comprises two electrical contacts 320 and 321 and one actuation mechanism 304. The end shock protection switches 210 and 310 are a type of momentary switch, normally "off", which can be of a contact type (such as a snap switch, a push-button switch, or a micro switch) or of a non-contact type (such as electro-mechanical, magnetic, optical, electro-optic, fiber-optic, infrared, or wireless based). The proximity control or sensing range of the non-contact type protection switch is normally up to 8 mm.

The lamp base 260/360 uses the bi-pin 250/350 to connect the AC mains to the LED driver 400 through the shock protection switch 210/310, normally in "off" state. When pressed in, the actuation mechanism 204/304 actuates the switch 210/310 and turns on the connection between the AC mains and the LED driver 400 through an internal wire connection 411/412.

Even with the two end shock protection switches, one each on the two ends, when such an LL lamp is in the fixture with two bi-pins in the lamp socket, the LL lamp is still vulnerable to another shock hazard due to high voltage breakdown because consumers must touch the metallic heat sink to do maintenance. This happens when a high voltage spike appears at either one of bi-pins, and a high voltage breakdown occurs along the way through the internal wire connections 411, 412, 253, and 254, the LED driver 400, and the LED arrays 214 on an LED PCB to the metallic heat sink 201. If this is the case, an excessive leakage current will flow from the breakdown point to the heat sink. A high voltage spike such as 1300 or 4000 volts can only break down a faulty LL lamp, which has a problematic driver or heat sink design, bad workmanship, or other detrimental environmental factors on it. For example, a problematic driver design might result from an insufficient insulation between input and output circuits. A problematic heat sink design might result from an insufficient distance of the air gap between the conductors in the lamp and the heat sink. When there exist material and workmanship defects, the environmental factors such as dirt, contaminants, humidity, vibration, and mechanical shock will reduce the breakdown voltage and facilitate a current flow through an insulation breakdown point. This condition can create a shock hazard to anyone who comes into contact with the metallic heat sink on the faulty LL lamps if care is not well taken.

Figure 5:
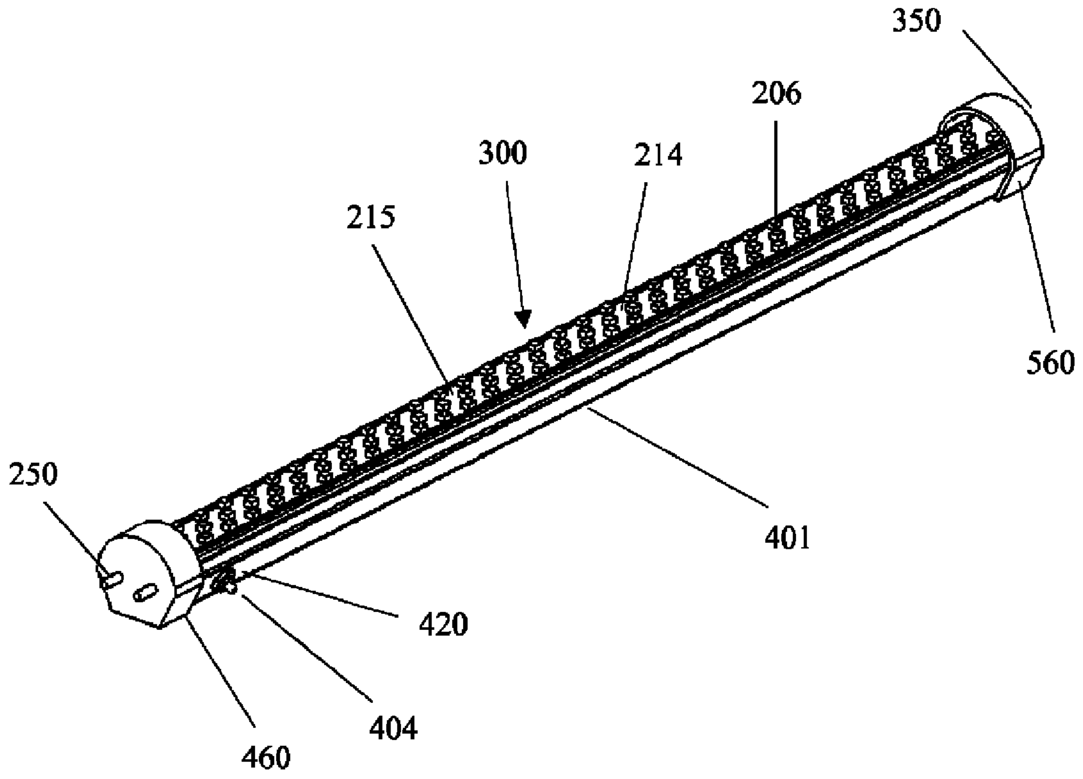
FIG. 5 is an illustration of an LL lamp with a utility shock protection switch on the heat sink according to the present invention.

FIG. 5 is an illustration of an LL lamp with a utility shock protection switch on the heat sink to solve the potential problem of high voltage breakdown that may cause shock hazard when consumers touch the heat sink of the LL lamp in the fixture with faulty electrical designs or wiring. As shown, the LL lamp 300 comprises two lamp bases 460 and 560 with bi-pins 250 and 350 (not shown), LED arrays 214 on an LED PCB 215 with a plurality of LEDs 206, heat sink 401, and a utility shock protection switch 420. The utility shock protection switch 420 is mounted on the heat sink 401 such that the actuation mechanism 404 can be easily accessed by the consumers when the LL lamp is in place in the fixture and operational.

Figure 6:
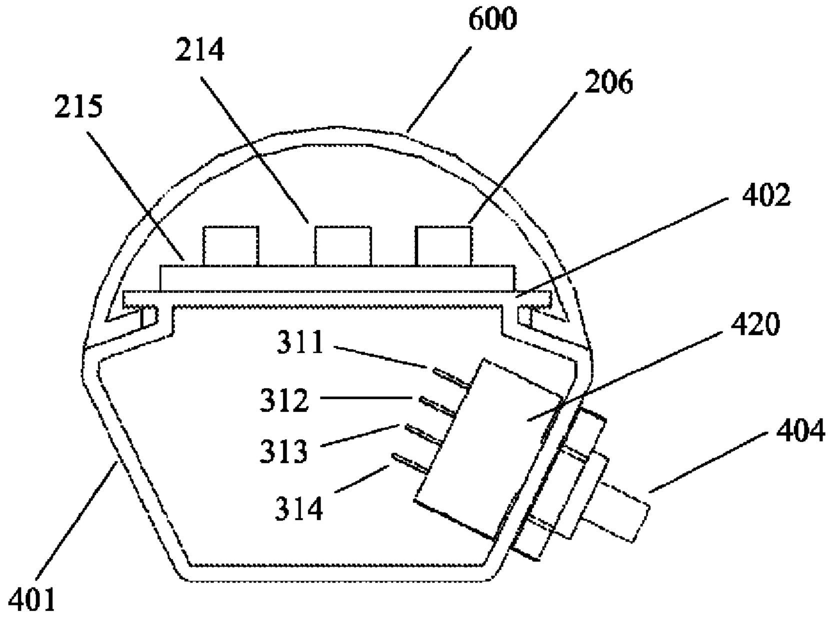
FIG. 6 is a section view of an LL lamp with a utility shock protection switch according to the present invention.

FIG. 6 is a section view of the LL lamp with the utility shock protection switch, omitting the lamp bases and the driver. As shown, the LL lamp has LED arrays 214 on the LED PCB 215 mounted on a platform 402 of a heat sink 401, a lens 600, and a utility shock protection switch 420, which has an actuation mechanism 404, four electrical contacts 311, 312, 313, and 314, mounted on one of the facets of the heat sink 401.

Figure 7:
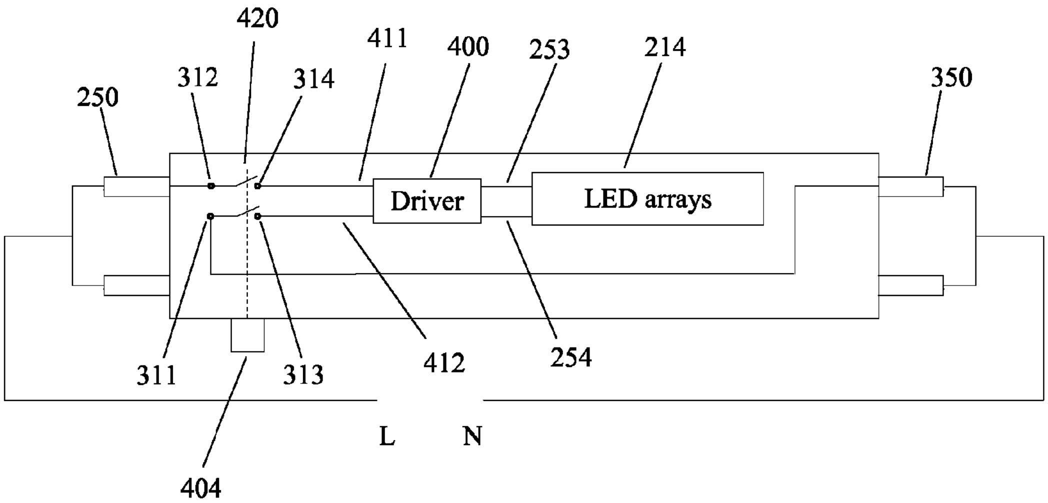
FIG. 7 is a functional block diagram of an LL lamp with a utility shock protection switch on the heat sink as illustrated in FIG. 5.

FIG. 7 is a functional block diagram of an LL lamp with a shock protection switch on the heat sink. The line wire and neutral wires of the AC main are connected to the bi-pin 250 and 350, respectively. The utility shock protection switch 420 is of a type of latching and single-throw double-pole, which simultaneously turns the two pairs of connections "on" or "off" and maintains its state after being actuated until it is actuated again. In this case, the line wire and neutral wire connections from the AC main to the inputs of the driver 400 can be turned "on" or "off". If the utility shock protection switch 420 is turned "on", the input voltage from the AC main are connected to the driver 400 through the two pairs of connections via electrical contacts 312 and 314, and 311 and 313 in the switch and internal electrical wire connections 411 and 412. Then the DC voltage is applied to the LED arrays 214 through electrical wires 253 and 254. If the utility shock protection switch 420 is turned "off", the input voltage from the AC main is totally disconnected from the LED driver 400. This means that no internal high voltage breakdown is possible. Therefore, this design completely eliminates the shock hazard due to high voltage breakdown that may occur during the service life of the LL lamp, in spite of the fact that this breakdown is most likely to happen in faulty LL lamps, as mentioned above.

Figure 8:
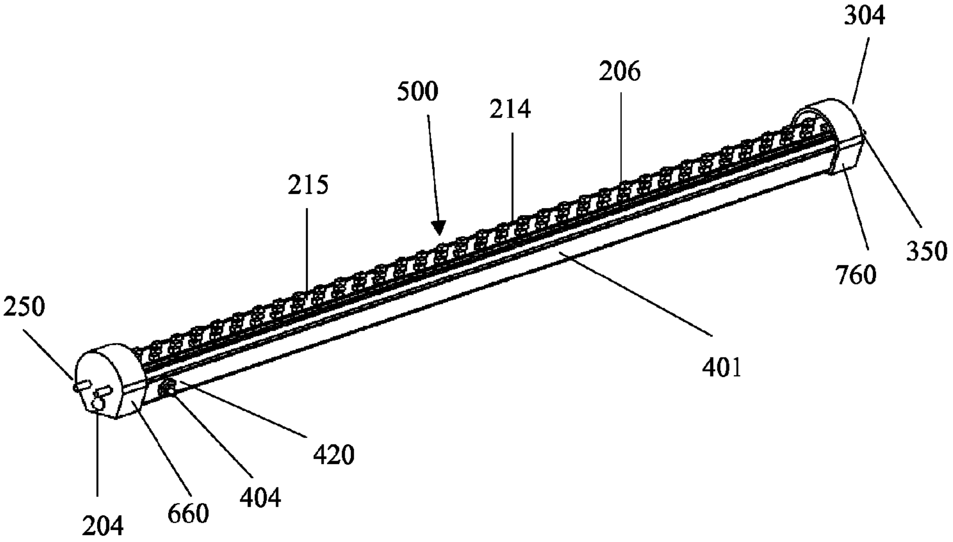
FIG. 8 is an illustration of a shock hazard-free LL lamp with double safety mechanism according to the present invention.
Figure 9:
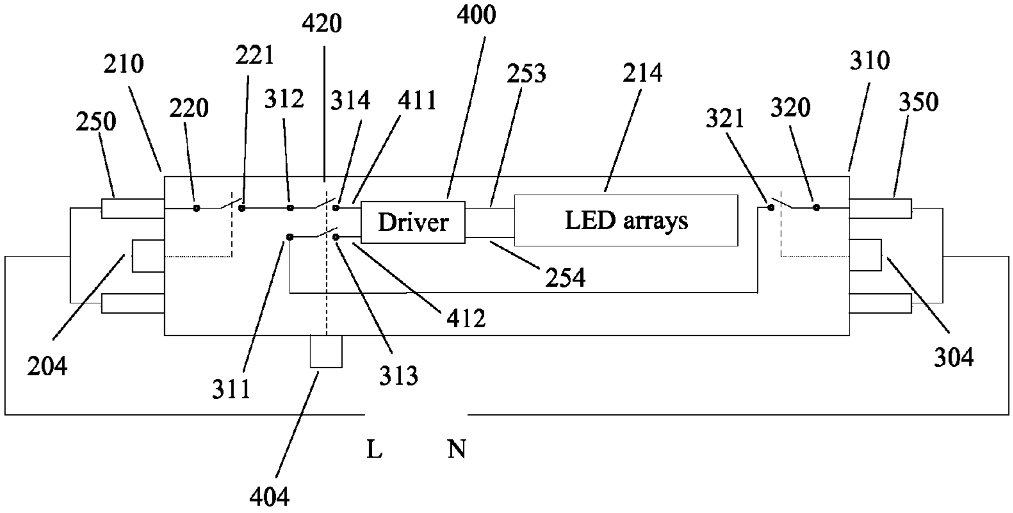
FIG. 9 is a functional block diagram of a shock hazard-free LL lamp with double safety mechanism as illustrated in FIG. 8.

FIG. 8 is an illustration of a shock hazard-free LL lamp with double safety mechanism according to the present invention. FIG. 9 is the functional block diagram of the LL lamp depicted in FIG. 8. The LL lamp 500 comprises a housing 401, two lamp bases 660 and 760, one at each end of the housing 401, two bi-pins 250 and 350 (not shown), two actuation mechanisms 204 and 304 (not shown) for shock protection switches 210 and 310, one each on the two lamp bases 660 and 760, an LED driver 400, an LED array 214 on an LED PCB 215 with a plurality of LEDs 206, and a utility shock protection switch 420 mounted on the heat sink 401 or other places on the lamp such that the actuation mechanism 404 can easily be accessed by consumers when the lamp is in place in the fixture and operational.

The double safety mechanism comprises three shock protection switches: two end protection switches and one utility protection switch. The end shock protection switches 210 and 310 on the two lamp bases 660 and 760 are of a momentary type and used to automatically shut off their internal electrical connections to the LED driver 400 when the bi-pins 250 and 350 are out of the lamp sockets such that the actuation mechanism 204 and 304 are not actuated. In this case, any leakage current from the line of the AC main through the LED driver 400 and LED arrays 214 will not appear at the exposed bi-pin. This prevents a shock hazard from happening at first. The utility shock protection switch 420 on the lamp is of a latching type and is used to switch two pairs of connections on or off at the same time: one from the line of the AC main through the bi-pin 250, the electrical contacts 220, 221, 312, and 314 and the input 411 of the LED driver 400 and one from the neutral of the AC main through the bi-pin 350, the electrical contacts 320, 321, 311, and 313 and the other input 412 of the LED driver 400. In such a scheme, when the utility shock protection switch 420 is turned off, no accidental voltage spikes will possibly appear between either of the bi-pins and the metallic heat sink during re-lamping or maintenance. Thus, any leakage current that may cause shock hazard is completely eliminated.

When consumers replace an LL lamp, they do not have to worry about getting electric shock if they accidently touch the exposed bi-pin 250 or 350 when the other bi-pin 350 or 250 is in the lamp socket because pressed-to-turn-on and released-to-turn-off design of the end shock protection switches 210 and 310 used on both ends of the LL lamp automatically shut off internal connections, no matter whether the utility shock protection switch 420 is turned on or not. When consumers do the maintenance of the LL lamp, they can just first turn off the utility shock protection switch 420 and do not have to worry about getting electric shock when they touch the heat sink 401 afterwards.

Although the utility shock protection switch 420 is on the heat sink, it can be anywhere on the LL lamp, as long as it can be fixed on the LL lamp. The utility shock protection switch 420 can be remotely controlled using an optical, infrared, or wireless controller. The two end shock protection switches 210 and 310 on both ends of the LL lamp can be proximity sensors with a control range of up to 8 mm.

The double safety approach can be used in an LL lamp for free of shock hazard operation. It seems straightforward but LL lamp manufacturers fail to recognize the potential shock hazard and continue to provide such products without any protection mechanism to consumers, who then may suffer from a risk of injuries or deaths. It is therefore the purpose of the present invention to present such designs.

What is claimed is:

1. A linear light-emitting diode (LED) tube lamp, comprising:

a housing having two ends;

a light-emitting diode printed circuit board (LED PCB) fixed between the two ends of the housing, the LED PCB having a plurality of LEDs fixed thereon;

an LED driver that powers the plurality of LEDs on the LED PCB, the LED driver having two inputs;

two lamp bases respectively connected to the two ends of the housing, each lamp base comprising an end face and a bi-pin with two pins protruding outwards through the end face; and a utility shock protection switch, wherein when the utility shock protection switch is actuated, the two bi-pins are electrically connected with the two inputs of the LED driver, respectively, and when the utility shock protection switch is unactuated, the two bi-pins are electrically disconnected from the two inputs of the LED driver.

2. The linear LED tube lamp of claim 1, wherein the utility shock protection switch comprises:

two pairs of electrical contacts, each pair comprising a first electrical contact connected to the bi-pin of one of the lamp bases and a second electrical contact connected to one of the two inputs of the LED driver; and a switch actuation mechanism, wherein when the switch actuation mechanism is actuated, the first electrical contact and the second electrical contact of each pair of electrical contacts are connected to actuate the utility shock protection switch so that the two bi-pins are respectively connected with the two inputs of the LED driver, and when the switch actuation mechanism is unactuated, the first electrical contact and the second electrical contact of each pair of electrical contacts are disconnected to unactuate the utility shock protection switch.

3. The linear LED tube lamp of claim 1, wherein the utility shock protection switch is of a contact type.

4. The linear LED tube lamp of claim 3, wherein the utility shock protection switch is a rocker switch, a toggle switch, a push-button switch, or a micro switch.

5. The linear LED tube lamp of claim 1, wherein the utility shock protection switch is of a non-contact type.

6. The linear LED tube lamp of claim 5, wherein the utility shock protection switch is electro-mechanical, magnetic, optical, electro-optic, fiber-optic, infrared, or wireless based.

7. A linear light-emitting diode (LED) tube lamp, comprising:

a housing having two ends;

a light-emitting diode printed circuit board (LED PCB) fixed between the two ends of the housing, the LED PCB having a plurality of LEDs fixed thereon;

an LED driver that powers the plurality of LEDs on the LED PCB, the LED driver having two inputs;

a utility shock protection switch; and two lamp bases respectively connected to the two ends of the housing, each lamp base comprising an end face, a bi-pin with two pins protruding outwards through the end face, and an end shock protection switch connected with the utility shock protection switch, wherein: when the bi-pin is inserted into a lamp socket, the end shock protection switch is actuated to electrically connect the bi-pin with the utility shock protection switch; when the end shock protection switch is unactuated, the bi-pin is electrically disconnected from the utility shock protection switch, wherein when the utility shock protection switch is actuated, the two end shock protection switches are electrically connected with the two inputs of the LED driver, respectively, and when the utility shock protection switch is unactuated, the two end shock protection switches are electrically disconnected from the two inputs of the LED driver, and wherein the two bi-pins are respectively connected with the two inputs of the LED driver only if the two end shock protection switches and the utility shock protection switch are actuated.

8. The linear LED tube lamp of claim 7, wherein the end shock protection switch of each of the two lamp bases comprises:

two electrical contacts, one electrically connected with the bi-pin of the respective lamp base, and the other electrically connected with the utility shock protection switch; and a switch actuation mechanism having a front portion protruding outwards through the end face of the respective lamp base, wherein when the front portion of the switch actuation mechanism is pressed in by inserting the bi-pin of the lamp base into a lamp socket, the two electrical contacts of the end shock protection switch are electrically connected to actuate the end shock protection switch so that the bi-pin is electrically connected with the utility shock protection switch.

9. The linear LED tube lamp of claim 8, wherein the utility shock protection switch comprises:

two pairs of electrical contacts, each pair comprising a first electrical contact connected to the end shock protection switch of one of the lamp bases and a second electrical contact connected to one of the two inputs of the LED driver; and a utility switch actuation mechanism, wherein when the utility switch actuation mechanism is actuated, the first electrical contact and the second electrical contact of each pair of electrical contacts are connected to actuate the utility shock protection switch so that the two end shock protection switches are respectively connected with the two inputs of the LED driver, and when the utility switch actuation mechanism is unactuated, the first electrical contact and the second electrical contact of each pair of electrical contacts are disconnected to unactuate the utility shock protection switch.

10. The linear LED tube lamp of claim 7, wherein the utility shock protection switch comprises:

two pairs of electrical contacts, each pair comprising a first electrical contact connected to the end shock protection switch of one of the lamp bases and a second electrical contact connected to one of the two inputs of the LED driver; and a utility switch actuation mechanism, wherein when the utility switch actuation mechanism is actuated, the first electrical contact and the second electrical contact of each pair of electrical contacts are connected to actuate the utility shock protection switch so that the two end shock protection switches are respectively connected with the two inputs of the LED driver, and when the utility switch actuation mechanism is unactuated, the first electrical contact and the second electrical contact of each pair of electrical contacts are disconnected to unactuate the utility shock protection switch.

11. The linear LED tube lamp of claim 7, wherein the end shock protection switches and/or the utility shock protection switch are of a contact type.

12. The linear LED tube lamp of claim 11, wherein the end shock protection switches are each a snap switch, a push-button switch, or a micro switch.

13. The linear LED tube lamp of claim 11, wherein the utility shock protection switch is a rocker switch, a toggle switch, a push-button switch, or a micro switch.

14. The linear LED tube lamp of claim 7, wherein the end shock protection switches and/or the utility shock protection switch are of a non-contact type.

15. The linear LED tube lamp of claim 14, wherein the end shock protection switches and the utility shock protection switch are electro-mechanical, magnetic, optical, electro-optic, fiber-optic, infrared, or wireless based.

16. The linear LED tube lamp of claim 14, wherein the end shock protection switches have a proximity control or sensing range up to 8 mm.

* * * * *